Figure 1:
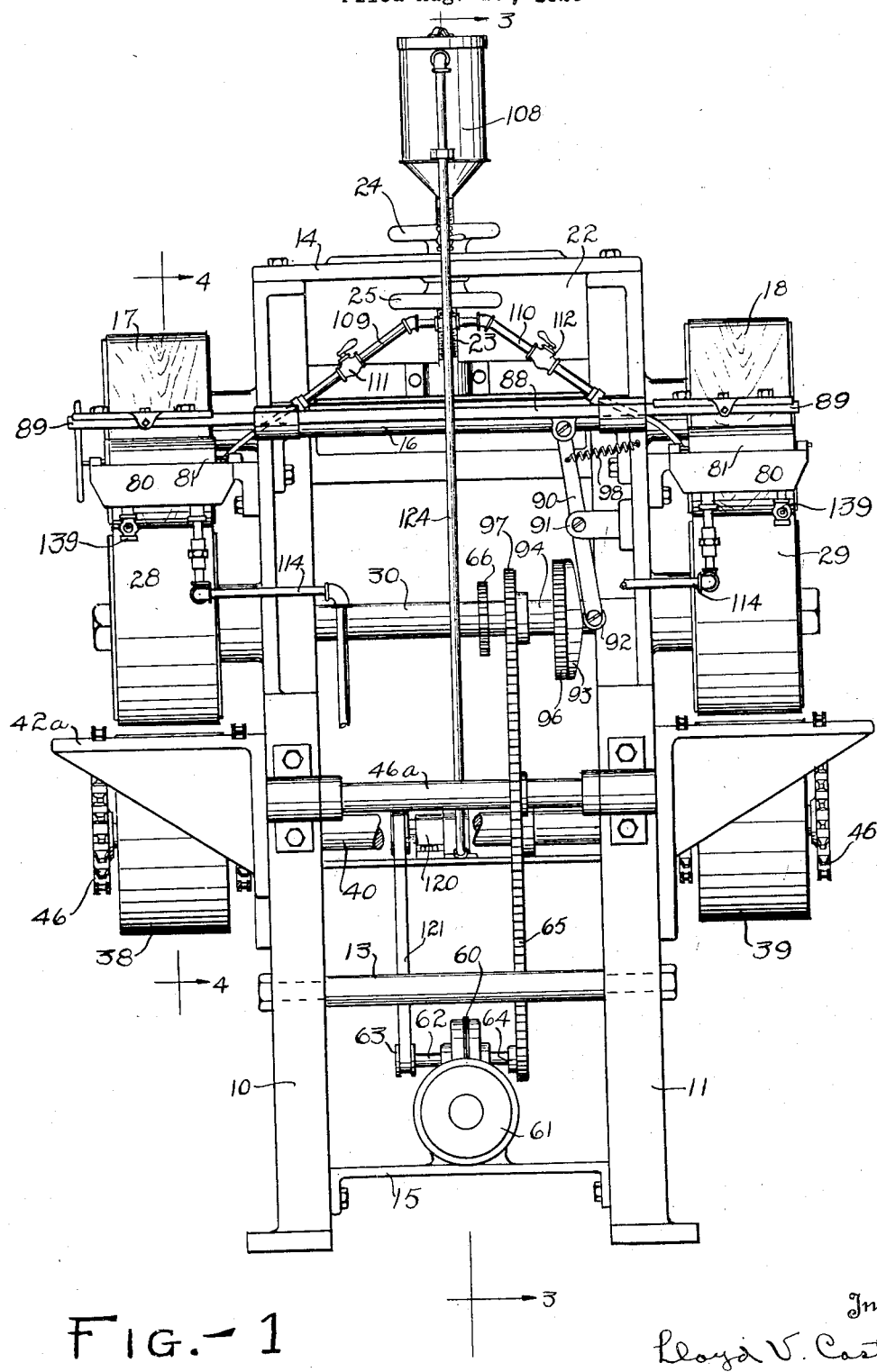

June 2, 1931.  L. V. CASTO ET AL  1,807,894
SURFACE DECORATING MACHINE, APPARATUS, AND METHOD
Filed Aug. 16, 1926  5 Sheets-Sheet 2

Inventor
Lloyd V. Casto and
George E. Lang
By Bates, Macklin, Golrick & Teare
Attorneys June 2, 1931.  L. V. CASTO ET AL  1,807,894

SURFACE DECORATING MACHINE, APPARATUS, AND METHOD

Filed Aug. 16, 1926  5 Sheets-Sheet 4

Inventor
Lloyd V Casto and
George E Lang
By Bates Macklin Gulick &
Attorneys

June 2, 1931.   L. V. CASTO ET AL   1,807,894
SURFACE DECORATING MACHINE, APPARATUS, AND METHOD
Filed Aug. 16, 1926    5 Sheets-Sheet 5

Inventors
Lloyd V. Casto and
George E. Lang
By Bates, Macklin, Golrick & Teare
Attorneys Patented June 2, 1931

1,807,894

UNITED STATES PATENT OFFICE

LLOYD V. CASTO AND GEORGE E. LANG, OF DETROIT, MICHIGAN, ASSIGNORS TO OXFORD VARNISH CORPORATION, OF DETROIT, MICHIGAN, A CORPORATION OF MICHIGAN

SURFACE DECORATING MACHINE, APPARATUS AND METHOD

Application filed August 16, 1926. Serial No. 129,443.

This invention is concerned with a machine, apparatus and method directed to the application of a wood or other graining effects to hard surfaces such as board and metal panels.

Machines for effecting wood grain and like finishes on hard surfaces usually embody some form of a master plate or roll having a variegated indented surface and pigment is applied to the plate or roll in a suitable manner to fill the indentations or interstices thereof, and thereafter the surplus pigment on the roll surface is scraped or removed therefrom and a resilient or gum roll is brought into contact with the pigment carrying roll to effect a transfer of the pigment from the interstices to the surface to be grained. Indented master or pattern rolls or plates have been made in various ways and it is the present practice to reproduce on the plate or roll surface, a reproduced etched pattern of the grain to be simulated by the well known photogravure process. To obtain continuous productive results, however, when using such an etched roll the manner of pigment application becomes important.

It is an object of our present invention therefore to provide a machine which embodies coordinated means for applying an agitated pigment to an etched pattern roll and which will also function in a continuous manner to maintain the pattern roll and the resilient roll free of all surplus pigment during the continuous operation of the machine.

A further object is to provide an improved surface decorating apparatus and method, particularly in connection with graining or surface decorating comparatively thin blanks, such as sheet metal panels, having raised and indented effects on opposite sides thereof.

A further object of our present invention is the provision of a machine wherein the pigment is maintained in a fluid circulating condition during the various continuous operations during the machine and whereby the accumulation of coagulated pigment clots and extraneous matter is prevented on the grain effecting parts of the machine.

A further object of our invention is the provision of a machine which will be readily adaptable to the application of wood grain effects to work of varying dimensions, the arrangement of the cooperating parts being such that a ready and accurate adjustment of these parts may be accomplished without necessitating the stopping of the machine for any protracted periods.

A further object is to provide a graining machine with the cooperating graining rolls disposed exteriorly of the machine frame, to afford a ready accessibility of the workman to the various parts of the machine which accomplish the actual graining of the work.

A still further object is the provision of a machine which may be duplex in character insofar as the particular cooperating elements which effect the actual graining of the work are concerned but which duplex parts can be mounted on a single machine frame having a common driving means therefor.

A still further object is to provide a conveyor mechanism in association with the graining rolls of the machine which will be adaptable to the conveying of various forms of all work to which the grain is applied by the machine.

Other objects of our invention will hereinafter become apparent from the following description which refers to the accompanying drawings. The essential characteristics are summarized in the claims.

Figure 2:
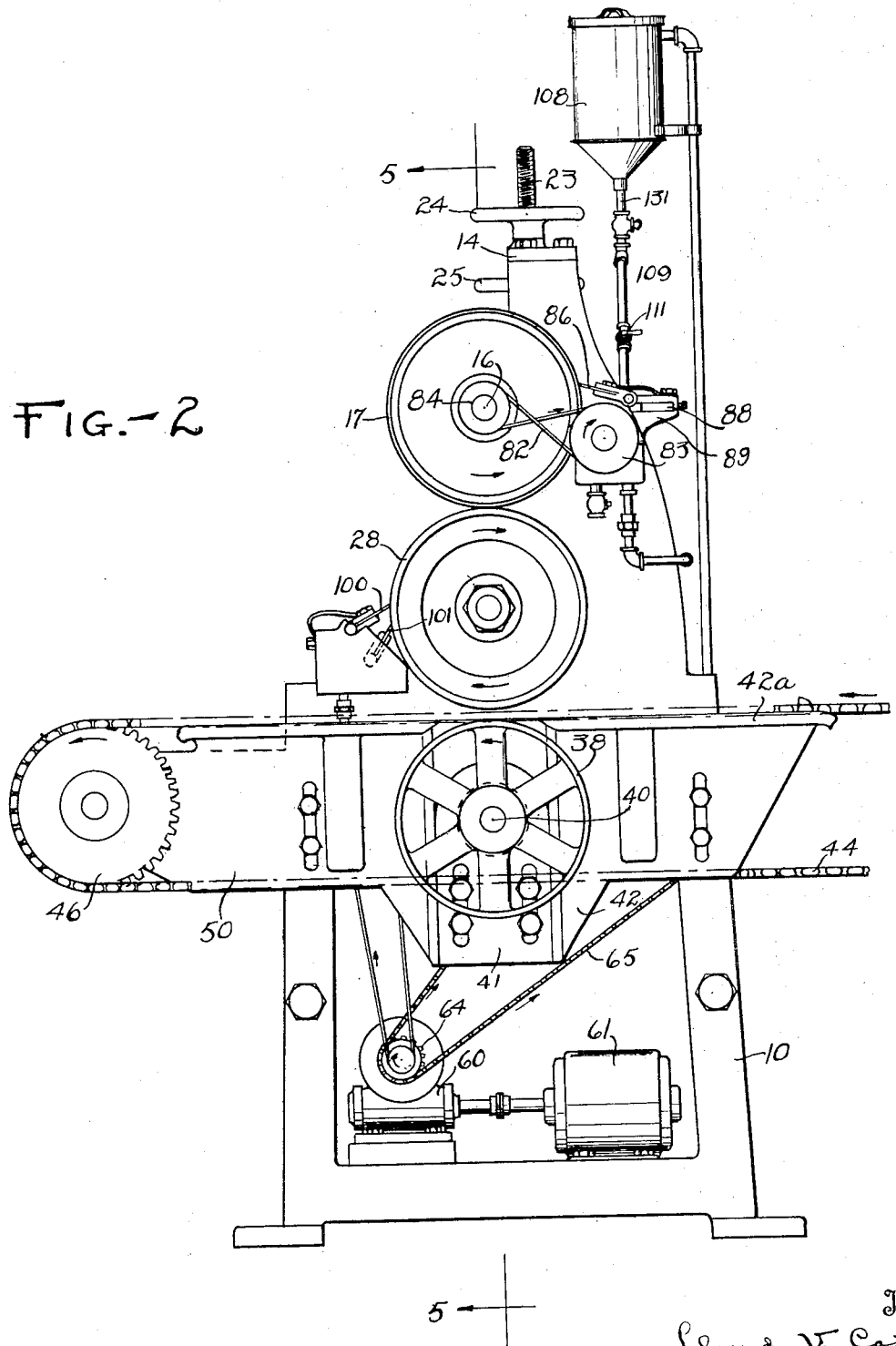
Figure 3:
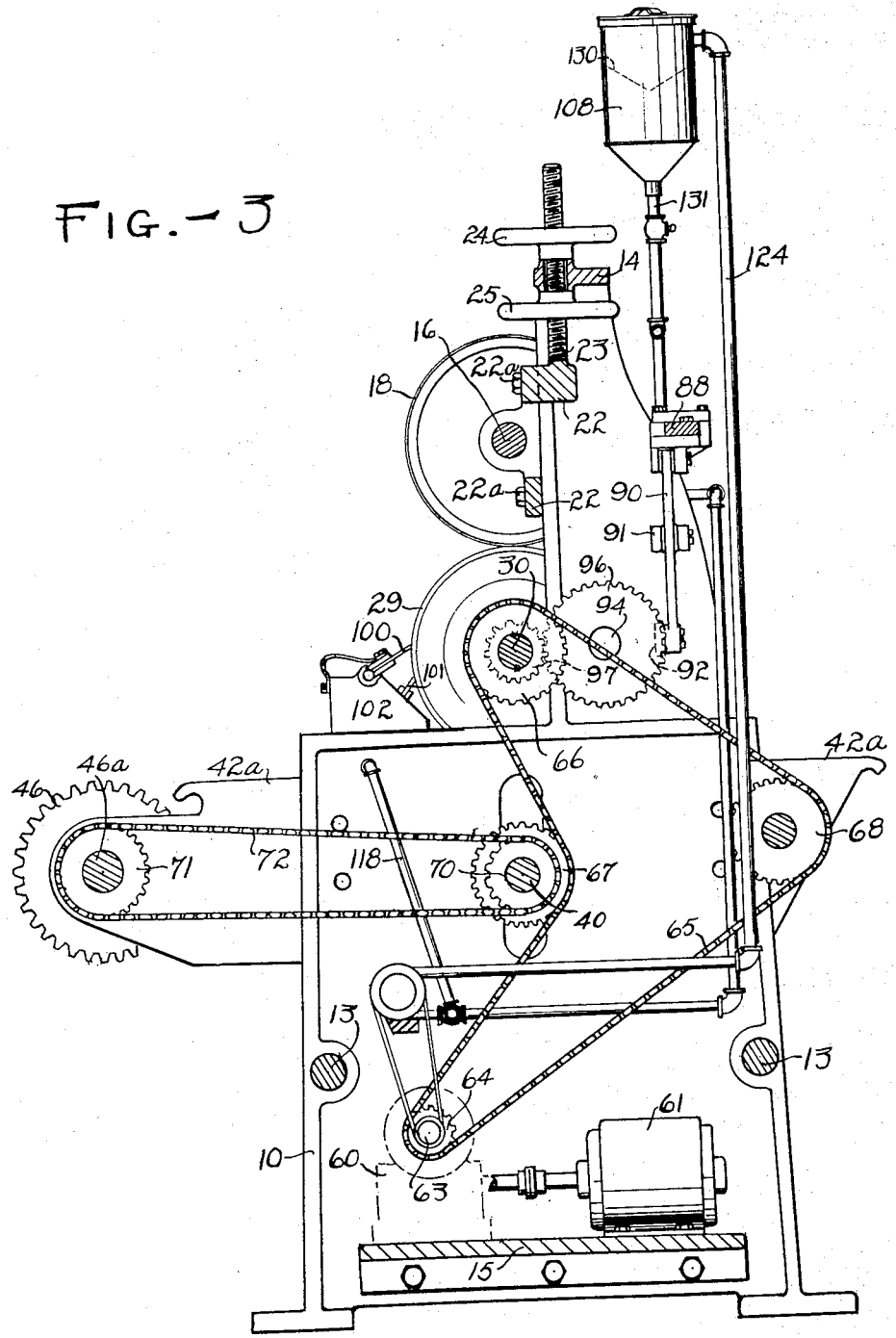
Figure 4:
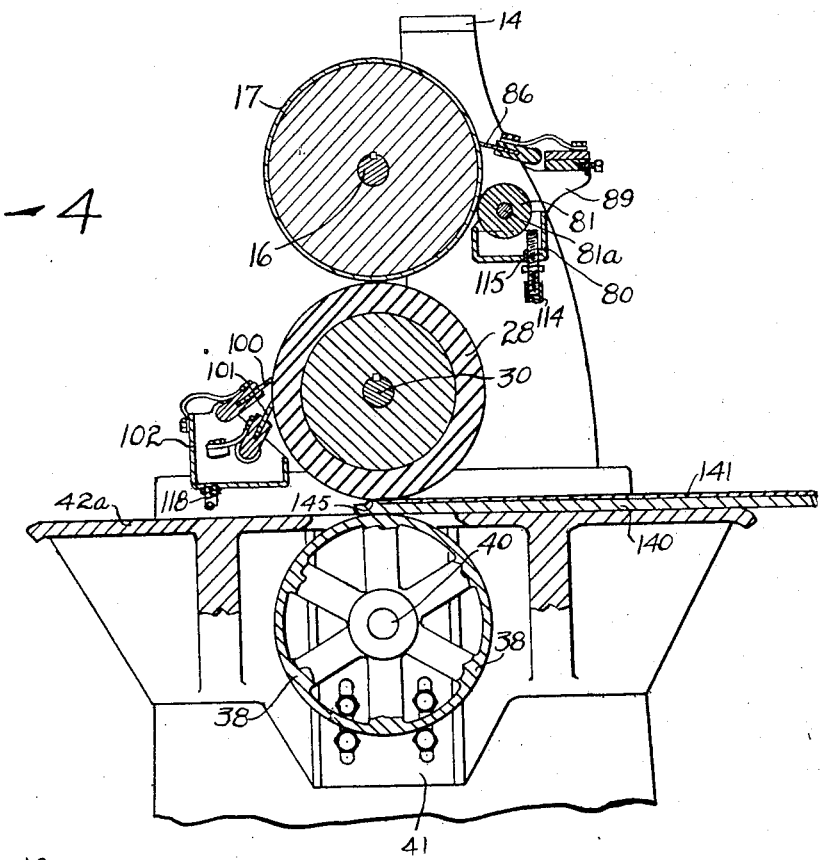
Figure 8:
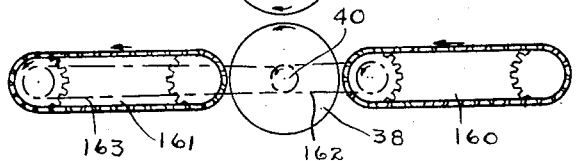
Figure 9:
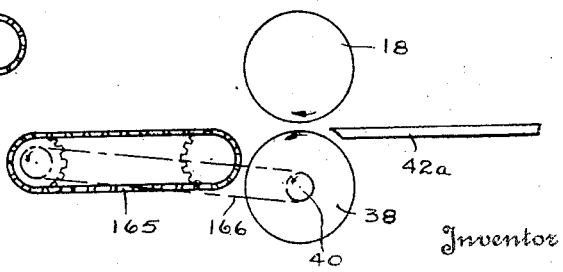
Figure 5:
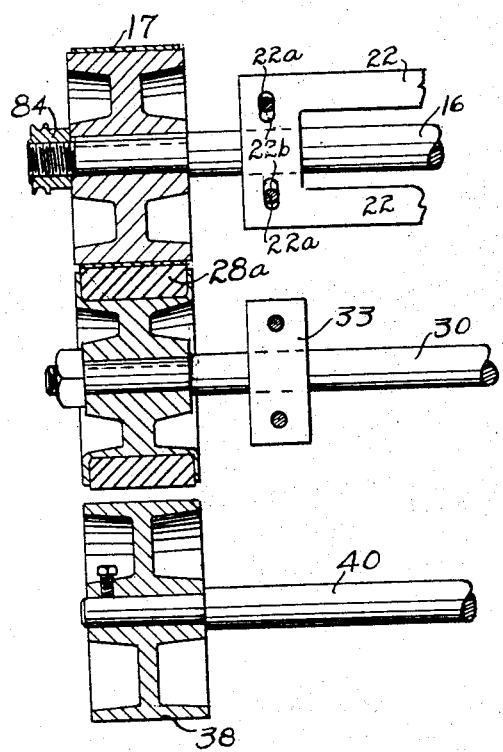
Figures 6, 7:
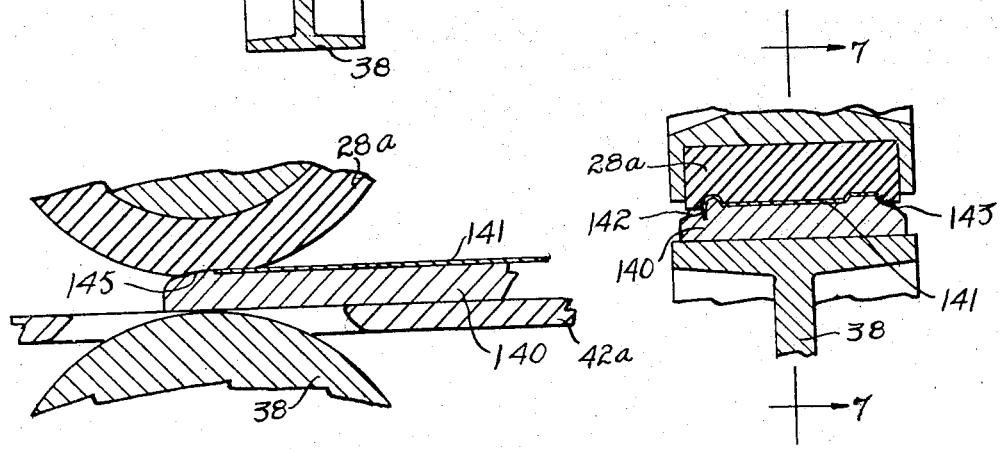

In the drawings Fig. 1 is a front elevation of a graining machine embodying the various features of our invention; Fig. 2 is a side elevation of the machine shown in Fig. 1; Fig. 3 is a cross-sectional side elevation taken through the machine substantially along the line 3—3 of Fig. 1; Fig. 4 is an enlarged cross-sectional view taken through the graining elements of the machine and substantially along the line 4—4 in Fig. 1; Fig. 5 is an enlarged cross-sectional detail taken through the machine rolls substantially along the line 5—5 of Fig. 2; Fig. 6 is an enlarged fragmentary cross-sectional view showing the relation of the work to the rolls during the transfer of the grain to the work; Fig. 7 is a cross sectional view taken substantially along the line 7—7 in Fig. 6; Fig. 8 is an alternate form of conveyor mechanism adaptable to our machine and Fig. 9 is still another form of mechanism for conveying the work being grained.

In our present machine, we provide a pattern roll or grained metallic roll the graining pattern of which may be effected in any suitable manner, but preferably by the well known photogravure process wherein a screen is used when the carbon resist is made preparatory to the actual etching of the roll, thus forming a screened intaglio printing surface. We also provide a gum roll in frictional contact with the grained roll and but one of these rolls is positively driven, the other roll being frictionally driven by the positively driven roll and we have shown in our drawings a machine with these rolls disposed in a readily accessible operating position. As shown, the machine may be duplex in character to accommodate the use of two grained rolls which may be of different pattern if desired but operated by a common driving mechanism.

In Figs. 1 and 3 we show a machine having a body or frame comprising upright side members 10 and 11 which may be rigidly secured together by cross bars 13 attached to the lower portions thereof; a top frame member 14 and a cross frame member 15 disposed adjacent the bottom of the machine. The frame members 10 and 11 constitute a support or standard for a top shaft member 16 which supports the grain or pattern rolls 17 and 18 in overhanging relation to the side frame members 10 and 11. The shaft 16 is preferably not mounted directly upon the frame members 10 and 11 but is supported by an adjustable bearing frame 22 which may be suspended on one or more screw members 23 attached thereto. Only one screw member is shown herein. The screw members 23 are engaged by adjusting wheels 24 and 25 respectively, disposed above and below the top cross frame member 14. Bolts 22a (see Figs. 3 and 5) engage the frame members 10 and 11 and extend through slots 22b formed in the bearing frame 22. The bolts serve to clamp the bearing frame and shaft 16 in adjusted position.

Disposed immediately beneath and in contact with the grained rolls 17 and 18 are take-off rolls 28 and 29, the surfaces of which are formed of any suitable resilient material for effecting the transfer of the pigment from the grained surfaces of the pattern rolls. These latter rolls may be rotatably supported by a shaft 30 suitably mounted on fixed bearing members 33, secured directly to the side frame members 10 and 11. Arranged immediately beneath the take-off rolls 28 and 29 are work supporting rolls 38 and 39.

A conveyor system to be hereinafter described is arranged in association with the work supporting rolls and the conveyor and rolls are adjustable relative to the take-off rolls whereby various forms of work may be accommodated by the machine. Thus the work supporting rolls may be carried by a shaft member 40 and the shaft member 40 is preferably supported by adjustable bearings 41 secured to work guides comprising a pair of table or bracket members 42 adjustably secured to the outer faces of the frame members 10 and 11. These table members may, if desired, comprise a part of a conveyor means such as shown in Fig. 2, to effect the shifting of the work to be grained from one side to the other of the take-off rolls. Thus the work may be moved into contact with the work supporting rolls 38 and 39 and the take-off rolls 28 and 29 with the surfaces to be grained presented to the resilient surfaces of the take-off rolls 28 and 29. Extending over and under the table members are chain or link belt stretches 44 having one stretch extending over the top portion 42a of the table members 42 at each side of the work supporting and take-off rolls (see Fig. 1) and these stretches pass over sprocket members 46 rotatably mounted on extensions 50, formed on the table members 42.

The driving of the various rolls and the conveyors may be effected in the following manner. Disposed adjacent the bottom of the machine and mounted upon the cross frame member 15 (see Figs. 1, 2 and 3) is a speed reduction mechanism in the form of a worm and gear (not shown) suitably housed in an oil casing 60. The speed reduction mechanism is driven by a motor 61 also supported by the frame member 15. Extending from each side of the casing 60 is a worm gear shaft 62, the extensions of which respectively carry a belt pulley 63 and a chain sprocket 64. The chain sprocket 64 drives an upwardly extending chain stretch 65 and the chain 65 extends over sprocket members 66 and 67, respectively mounted upon the shafts 30 and 40 and also extends over an idler sprocket 68 suitably mounted on the machine frame whereby the take-off rolls 28 and 29 and work supporting rolls 38 and 39 may be positively driven in the proper directions while remaining in spaced apart relation for the passage of the work therebetween. The conveyor sprockets 46 may be driven through the sprocket supporting shaft 46a and the shaft 46a is driven by the shaft 40 through sprockets 70, 71 and chain 72.

In Fig. 8 we show a modified form of conveyor arrangement wherein conveyor 160 may lead up to the table members 42 and another conveyor 161 disposed on the opposite side of the roll 38 receives the work after it passes between the work supporting roll 38 and the take-off roll 28 and conveys it away. As hereinbefore described, these conveyor mechanisms may be driven at a proper speed relative to the rotating coaction of the rolls 28 and 38 by chains 162 and 163 driven from the work supporting roll shaft 40. It is to be understood that in this conveyor arrangement the work supporting roll 38 and the conveyor mechanisms 160 and 161 may be relatively adjustable and also the roll 38 may be adjustable relative to the roll 28. In Fig. 9 we show still another form of conveyor arrangement wherein the work may be manually fed to the work supporting roll 38 and the take-off roll 28 by positioning it on the top 42a of the members 42 and as the work passes between the rolls it is positioned upon a conveyor mechanism 165, driven in proper relation to the work supporting roll and take-off roll by a chain 166, the latter being driven by work supporting roll shaft 40.

In the present instance the grained rolls 17 and 18 are brought into contact with the take-off rolls 28 and 29, by means of the adjusting wheels 24 and 25, with sufficient frictional contact whereby the grained rolls may be driven by the take-off rolls without any resulting slippage taking place between the surfaces of the coacting rolls.

In certain classes of metal finishing work and particularly the graining of metals which are to have a baked finish, special pigments should be used if the best results are to be obtained. The use of such pigments in a graining machine of the character we herein describe, however, is accompanied by difficulties which we obviate by maintaining a circulation of the fluid pigment being used and we also constantly strain the pigment to remove clots and skin formations which would otherwise seriously interfere with the proper application of the pigment to the grain rolls and the accurate transferring of the pigment from the grained roll to the take-off roll.

We arrange this circulating system on the machine in such manner as to not interfere with the accessibility of the operator to the roll elements thereof and we also arrange the pigment applying devices and the mechanism for actuating the doctor blades and the take-off roll cleaning mechanisms in cooperative relation to the respective rolls whereby the gravitational flow of the circulating pigment may be obtained from a tank or reservoir supported by the machine frame at a sufficient elevation above the grained rolls to assure a constant flow of the pigment to the pigment applying mechanisms.

We will first describe the pigment applying and removing mechanisms. The pigment applying mechanism may comprise fountain trays 80 secured to and extending outwardly from the side members of the machine frame. Fountain bodies support pigment applying roller member 81 arranged to have the lower portions thereof submerged in the pigment carried by the trays. The fountain rollers may be driven by belt members 82 extending over pulleys 83 secured to the ends of the fountain roll shafts 81a and pulley members 84 mounted on the outer ends of the shaft member 16. The diameters of the pulley members 83 and 84 are such that the fountain rollers 83 may be driven at different linear speeds than the grained rolls whereby a slipping action tends to take place between the grained rolls and the fountain rollers when the machine is in operation Disposed immediately above the fountain trays 80 and fountain rollers 81 are resiliently supported reciprocating doctor blades 86. The doctor blades bear against the surfaces of the grained rolls to remove all surplus pigment deposited by the fountain rollers 81 on the grained rolls. The doctor blades are supported on and actuated by a transversely extending bar 88 supported by bearing brackets 89 formed on the side frame members 10 and 11. The mechanism for actuating the doctor blades may comprise a lever member 90 operatively attached to the underside of the bar 88, the lever being supported as shown at 91 (see Figs. 1 and 3) by the side frame member 11. The lower end of the lever 90 carries a cam roller 92 which is acted upon by a cam member 93. The cam member is rotatably supported on a stud 94 secured to the side frame 11 and may have attached thereto, a gear 96 which may be driven by a pinion 97 mounted on the take-off roll shaft 30. A spring member 98 (see Fig. 1) tends to maintain the doctor blade actuating bar 88 to the right of the position shown in Fig. 1. The rise on the cam 93 actuates the bar to the left against the influence of the spring 98 as the shaft 30 rotates. The bar 88 is thus reciprocated thus causing the doctor blades to have an axial movement relative to the shaft 16. This movement of the doctor blades relative to the grained rolls prevent local wear between the doctor blades and the etched surfaces of the grained rolls.

The take-off rolls 28 and 29 after having imparted the pigment pattern thereon to the work are subjected to the cleaning action of two resiliently urged doctor blades 100 and 101 operatively supported by pigment receiving trays 102. These trays may be suitably mounted on the side frame members 10 and 11 to receive the pigment scraped from the take-off rolls, by the doctor blades 100 and 101. We have found that thin metal blades are quite effective in maintaining the gum surfaces of the take-off rolls in a clean transfer receiving condition without any deleterious effects on the take-off rolls.

The fluid pigment is fed to the fountain trays 80 from a supply tank or reservoir 108 through a pipe 131 from which extend feed pipes 109 and 110 that direct the pigment to the fountain trays. Individual valves 111 and 112 are provided in the pipe lines 109 and 110 respectively, whereby the amount of flow to each fountain tray may be separately regulated. These valves are set to permit a flow of pigment to the fountain trays 80 which will be in excess of the pigment being consumed by the continuous operation of the machine.

Fountain tray drain lines 114 are provided to remove the overflow of surplus pigment from the trays 80. These drain lines 114, however, are connected to the fountain trays in such a manner that members 115, comprising the connecting ends of the drain lines with the fountain trays may extend into the trays. The efficient pigment level varies in accordance with the characteristics of the pigment being applied to the work being grained. Hence the members 115 are adjustable relative to the drain lines and the fountain trays whereby they may be adjusted to maintain any desired pigment level in the fountain trays. Thus the most efficient pigment level may be maintained in the fountain trays relative to the fountain rollers 81 whereby splashing of the pigment by the fountain rollers is prevented and also the elevation of an excess of pigment from the fountain trays to the grained surfaces of the pattern rolls is prevented.

The lines 114 extend downwardly to a pump 120 and may be joined with drain pipes 118 extending downwardly from the pigment collecting trays 102. The pump is driven by a belt 121 extending over the pulley 63 and serves to return the pigment through an upwardly extending line 124 to the top of the supply reservoir or tank 108. A screen 130 is interposed between the tank inlet of the pipe line 124 and the outlet line 131 of the tank, to constantly strain the pigment after it is circulated through the machine by the action of gravity and the force of the pump 120.

When it is desired to remove the pigment in circulation in the machine or use a pigment of a different shade, the machine may be cleaned by draining the pigment through drain cocks 139 depending from the undersides of the fountain trays 80 whereafter the valves 139 may be closed and a suitable cleaning fluid circulated through the various pipes by the influence of the pump 120. The doctor blades 86, 100, and 101 are mounted in a convenient manner to facilitate their ready removal from the machine whereby they may be cleaned.

It is to be understood that a machine of the character such as we herein describe may be utilized without including the use of a conveyer, such as is shown in the drawings, for the work supporting rolls 38 and 39 may alone be used to pass the work into pressing contact with the take-off rolls 28 and 29. In either event, however, the shaft 40 carrying the work supporting rolls 38 and 39 should be adjustably supported relative to the work shaft 30 whereby work carrying trays of varying dimensions may be inserted between the work supporting rolls and the take-off rolls and the proper pressure relationship between the take-off rolls and the surface of the work to be grained can be maintained.

In Figs. 4, 6 and 7, we show a particular type of work supporting tray 140 formed of wood or any suitable material of light weight for supporting the thin sheet metal work such as the member 141. The particular cross section of the work being operated upon, as shown in Fig. 6, is irregular but by providing a tray with a proper side clearance relative to the take-off roll surface as shown at 142 and 146 (see Fig. 6), to permit the gum 28a comprising the take-off roll to be distorted, the edges of the work as well as the major surface thereof may be simultaneously grained without any undue effects upon the gum, comprising the take-off roll. The clearance 142 and 143 provided by properly shaping the work supporting tray serve to prevent the accumulation of pigment on the tray during repeated use thereof. The particular form of tray shown is also provided at its forward end with a slightly inclined end surface extending above the edge of the work for the purpose of preventing the presentation of the short end edges thereof to the soft gum surface of the take-off roll. This arrangement is particularly useful when the adjusted relationship of the work support roll and the take-off roll 28 is such as to cause the gum surface of the take-off roll to follow the contour of the irregularly shaped work or when it is desired to grain the edges.

From the foregoing description of our invention, it will be apparent that we provide a graining machine embodying many novel refinements which are directed to maintain the efficient operation of the machine in high production and that the major operating elements, namely, the pattern rolls or etched rolls, the take-off rolls, and the work conveying rolls are all disposed exteriorly of the machine frame, thus affording a ready accessibility of the operating parts when the machine is in constant operation. The arrangement of the rolls is also such that the grained surface of the work as it is passing through the machine is visible to the operator and the control of the pigment as it varies in its fluid characteristics is at the instant command of the operator and further, by incorporating a pigment circulating system in the machine, we assure a constant and well regulated flow of repeatedly strained pigment, thus necessitating but a minimum of attention on the part of the operator to the consistency of the pigment during the operation of the machine.

It will be understood and is obvious that insofar as the general arrangement of mechanism herein shown is concerned, the pattern rolls may be of any known type. It will be further understood and is obvious that the pattern roll may be made otherwise than heretofore suggested, that is, it may comprise an etched copper cylinder in preferably intaglio, but of either the photogravure type or half tone type of printing surface. Further, the pattern roll may comprise an etched, or otherwise recessed wooden member which is another known way of making a pattern that is particularly used in intaglio graining work and already known prior to the present invention. While we have referred herein mainly to wood patterns, this is given merely by way of example; other natural or even artificial patterns may be used.

Having thus described our invention, we claim:

1. In a graining machine, the combination of a machine frame, a metallic pattern roll disposed on each side of the frame, a take-off roll disposed beneath each pattern roll and rotatably contacting therewith, a cushion roll spaced from and disposed beneath each take-off roll a common means for driving both sets of rolls, a pigment applying device including positively actuated means for removing pigment from the cylindrical surface of the pattern rolls and a cleaning device contacting with the surfaces of the take-off rolls and disposed to clean the surface of the take-off rolls, said rolls being arranged in overhanging relation to said frame.

2. In a wood graining machine, the combination of a machine frame, a pattern roll disposed at each side of the frame, take-off rolls rotatably contacting therewith, a common means for driving said sets of rolls, a pigment applying device for the pattern roll including positively actuated means for removing pigment from the cylindrical surface of the pattern rolls, a cleaning device disposed to clean the surfaces of the take-off rolls and a pigment circulating system associated with the pigment applying and cleaning devices.

3. In a wood graining machine, the combination of a pair of pattern rolls, a power driven resilient take-off roll disposed beneath each pattern roll and rotatably contacting therewith whereby the pattern roll is thus driven and work supporting rolls spaced from and disposed beneath the take-off rolls, a pigment applying device for the pattern rolls, a common means for driving said set of rolls, a cleaning device for the take-off roll and a system of pigment fountains and circulating pipes and including a pump for maintaining a flow of pigment to the pigment applying device and away from the cleaning device.

4. In a graining machine, the combination of a pattern roll, a unitary frame member adjustably supporting the pattern roll, a take-off roll rotatably contacting therewith a pigment applying device including a doctor blade for removing pigment from the cylindrical surface of the pattern roll, a cleaning device contacting with the surface of the take-off roll and means for maintaining a supply of fresh pigment to the pigment applying device including means for returning the pigment retrieved by the cleaning device to said pigment supply maintaining means.

5. In a graining machine of the character described, the combination of an etched pattern roll, a pigment applying device for applying pigment to the surface of the pattern roll including a reciprocating doctor blade operatively disposed to remove pigment from the cylindrical surface of the etched roll, a gum take-off roll mounted beneath the etched pattern roll and adapted to drive the pattern roll and a second gum roll mounted in spaced apart relation to and beneath the take-off roll, a take off roll cleaning device, and means for returning the pigment from the cleaning device to the pigment applying device.

6. In a wood graining machine of the character described, the combination of a pattern roll, a pigment applying device for continuously applying fresh pigment to the surface of the pattern roll, a doctor blade operatively disposed to remove surplus pigment from the cylindrical surface of the etched roll and return said surplus pigment to the applying device, a take-off gum roll mounted beneath the pattern roll and adapted to drive the pattern roll, a conveyor for carrying the work to be grained into contact with the gum roll and means for positively driving the conveyor and the gum roll in unison.

7. In a graining machine, the combination of an upright frame, a pattern roll disposed at each side of the frame, a take-off roll cooperatively arranged in contact with each pattern roll, a common means for driving said sets of rolls and means disposed outside of the frame for supporting work to be grained in contact with the take-off roll.

8. In a wood graining machine, the combination of an upright frame, a pair of pattern rolls and a pair of take-off rolls mounted outside of the frame, a separate pigment applying means for each pattern roll, a separate doctor blade for each pattern roll and a common means for automatically moving the doctor blades.

9. In a wood graining machine of the character described, the combination of a take-off roll having a resilient circumferential surface, a pattern roll contacting with the take-off roll whereby one of the rolls may be frictionally driven, means for driving one of the rolls, a pigment applying means including a doctor blade cooperatively arranged to apply pigment to the interstices of the pattern roll, and means for maintaining a gravitational flow of pigment to the pigment applying means.

10. In a wood graining machine of the character described, the combination of a take-off roll having a resilient circumferential surface, a pattern roll contacting with the take-off roll and adapted to be frictionally driven by the latter, means for driving the take-off roll, pigment applying means including a doctor blade cooperatively arranged to apply pigment to the interstices of the pattern roll, an upright frame supporting the take-off roll, a pigment receptacle mounted on the frame above the applying means and means for maintaining a circulatory movement of the pigment between the applying means and the pigment receptacle.

11. In a wood graining machine of the character described, the combination of a take-off roll, a pattern roll contacting with the take-off roll and adapted to be frictionally driven by the take-off roll, means for driving the take-off roll, pigment applying means including a doctor blade cooperatively arranged to apply pigment to the interstices of the pattern roll, an upright frame supporting the take-off roll, said pigment applying mechanism being mounted on the frame at one side of the pattern roll, a cleaning apparatus arranged to clean the take-off roll and means for returning the pigment removed from the take-off roll to the pigment applying means.

12. In a graining machine of the character described, the combination of a pair of grained pattern rolls, a pair of take-off rolls each having a resilient circumferential surface, one of each pair of the rolls serving to drive one of the rolls of the other pair, a common means for driving said pairs of rolls including, a shaft for each pair of rolls, a frame supporting the shafts, the rolls being mounted on the ends of the shafts and disposed outside of the frame and means for applying pigment to the pattern rolls and for removing pigment from the take-off rolls, said means being disposed to overhang the machine frame.

13. In a graining machine of the character described, the combination of a grained pattern roll disposed at each side of a machine frame, a take-off roll in contact with each pattern roll and having a resilient circumferential surface, one pair of the rolls serving to drive the other pair, means for driving the rolls including a shaft for each roll, the frame serving to support the shafts and said driving means, a third pair of rolls and shaft for supporting the work as it is passed into contact with the take-off roll, the rolls being mounted on the ends of the shafts disposed outside of the frame, said work supporting rolls being adjustable relative to the take-off rolls.

14. In a graining machine of the character described, the combination of a grained metallic roll, a resilient take-off roll and a conveyer means for bringing the work to be grained into contact with the surface of the take-off roll, said conveyer means including a work supporting tray having a roll approaching end thereof shaped to protect the surface of the take-off roll when the work is brought into contact therewith.

15. In a graining machine of the character described, the combination of a grained metallic roll, a resilient take-off roll and a conveyer means for bringing the work to be grained into contact with the surface of the take-off roll, said conveyer means including a work supporting tray having a roll approaching end thereof shaped to protect the surface of the take-off roll when the work is brought into contact therewith and means for adjusting the conveyer relative to the take-off roll.

16. In a graining machine of the character described, the combination of a grained roll, a take-off roll, pigment applying means for applying pigment to the grained roll, means for removing pigment from the surface of the take-off roll whereby the take-off roll is cleaned and means for transferring the pigment from the cleaning means to the pigment applying means.

17. In a graining machine of the character described, the combination of a grained metal roll, a take-off roll, pigment applying means for applying pigment to the grained roll, means for removing pigment from the surface of the take-off roll and means for supplying fresh pigment to the pigment applying means including a supply tank and a pump for drawing the pigment from the pigment removing means and returning it to the supply tank.

18. In a graining machine, a pattern roll and pigment fountain means for applying pigment to the surface of the pattern roll, said pigment fountain means including a reservoir disposed at an elevation above the pattern roll and means for maintaining a constant level of the pigment in the pigment fountain means.

19. In a graining machine, a pattern roll, a pigment applying means therefor, including a pigment fountain having a constant level means for the pigment therein, a take-off roll, means for removing pigment from the take-off roll including a pigment receiving tray, a supply reservoir, and pipes extending between the supply reservoir the pigment fountain and the pigment tray and a pump for maintaining circulation of the pigment between the reservoir, the fountain and the tray.

20. In a graining machine of the character described, the combination of an etched pattern roll, a pigment applying device for applying pigment to the surface of the pattern roll including a reciprocating doctor blade operatively disposed to remove pigment from the cylindrical surface of the etched roll, a gum take-off roll mounted to contact with the etched pattern roll, a second gum roll mounted in spaced relation to and beneath the take off roll, a take-off roll cleaning device and means for returning the pigment from the take-off roll cleaning device to the pigment applying means.

21. In a graining machine, the combination of a machine frame, printing mechanism, including rolls adapted to transfer pigment patterns, said rolls being disposed at each side of the frame, said rolls being arranged in overhanging relation to said frame, a pigment applying device to furnish pigment to said pattern transfer rolls, a cleaning device disposed adjacent the pattern transfer rolls to clean the surfaces thereof after transfer to the work, and a pigment circulating system associated with the pigment applying and cleaning devices.

22. In a graining machine, the combination of an upright frame, a pair of rolls in overhanging relation to the frame on each side thereof, said rolls being adapted to effect the transfer of a pigment pattern to work in the machine, a separate pigment applying device for one roll of each pair, a separate doctor blade for one roll of each pair to scrape pigment therefrom, and a common means for automatically moving the doctor blades.

23. In a graining machine of the character described, the combination of a resilient roll adapted to transfer a grained pattern to work in the machine, a conveyer for bringing the work to be grained into contact with the surface of the said roll, said conveyor including a work supporting tray having a roll approaching end thereof shaped to protect the surface of said roll when the work is brought into contact therewith.

24. In a graining machine of the character described, the combination of a resilient roll, pigment applying means including a pattern bearing member for applying pigment thereto, means for removing pigment from the surface of the resilient roll, and means for supplying fresh pigment to the pigment applying means, including a supply tank and a pump for drawing the pigment from the pigment removing means and returning it to the supply tank.

25. In a graining machine, a resilient roll adapted to transfer a pigment pattern to work in the machine, pressure means arranged to hold a piece of work in printing contact with the resilient roll, and cooperating means to support an elongated sheet metal blank of non-planular cross section for presentation to the resilient roll, said means comprising a device having a relief and indentation effect thereon adapted to enter corresponding indented and raised portions of the sheet metal blank on the back thereof to afford a strong support for such blank at the region of printing contact between the resilient roll and said pressure means.

26. Mechanism according to claim 25, wherein said cooperating means comprises a tray for holding the work, which tray has the relief and indented effect on one face and which extends outwardly beyond one edge of the piece to be supported thereby to protect the resilient roll against damage during the graining operation.

27. In decorating apparatus of the character described, a resilient transfer roll, means, including a pattern member, for imparting a pigment pattern to the transfer roll, a work supporting base having relatively raised and indented surface effects on its upper side disposed to substantially correspond in position and relative height to high and low under surfaces on a sheet metal blank to be decorated, and means to effect relative movement between the base, together with the blank supported thereby, and the transfer roll, to cause a decorative impression of the pattern to be made on the exposed surfaces of such blank.

28. The method of decorating a blank having a surface provided with raised and indented areas, comprising simultaneously supporting said blank substantially throughout its entire area, including the raised and indented areas, at the point of printing contact, and then simultaneously decorating the high and low areas by contact printing including the application of pressure.

In testimony whereof, we hereunto affix our signatures.

LLOYD V. CASTO.
GEORGE E. LANG.

DISCLAIMER 1,807,894.—*Lloyd V. Casto* and *George E. Lang*, Detroit, Mich. SURFACE DECORATING MACHINE, APPARATUS AND METHOD. Patent dated June 2, 1931. Disclaimer filed August 16, 1939, by the assignee, *Oxford Varnish Corporation*.

Hereby enters this disclaimer to claims 14, 23, 25, 27, and 28 of the above identified patent.

[*Official Gazette September 5, 1939.*]